(12) United States Patent
Goodnight

(10) Patent No.: US 6,457,561 B1
(45) Date of Patent: Oct. 1, 2002

(54) VISCOUS PUMPING SYSTEM

(75) Inventor: Thomas E. Goodnight, Bristol, VA (US)

(73) Assignee: Bristol Compressors, Inc., Bristol, VA (US)

( * ) Notice: Subject to any disclaimer, the term of this patent is extended or adjusted under 35 U.S.C. 154(b) by 0 days.

(21) Appl. No.: 09/577,625

(22) Filed: May 25, 2000

(51) Int. Cl.[7] .................................................. F01M 1/00
(52) U.S. Cl. ........................................ 184/6.16; 92/160
(58) Field of Search .............................. 184/6.16, 6.18; 384/115, 292, 398; 418/94; 92/160

(56) References Cited

U.S. PATENT DOCUMENTS

| | | | | |
|---|---|---|---|---|
| 1,321,478 A | * | 11/1919 | Russler ........................ | 384/292 |
| 2,021,633 A | | 11/1935 | Mikulasek | |
| 2,397,124 A | | 3/1946 | Buffington et al. | |
| 2,510,549 A | * | 6/1950 | Buchi ........................... | 384/398 |
| 2,598,476 A | | 5/1952 | Wightman | |
| 3,188,054 A | | 6/1965 | Mason, Jr. | |
| 3,238,000 A | | 3/1966 | Muijderman et al. | |
| 3,630,316 A | | 12/1971 | Sillano et al. .............. | 184/6.16 |
| 3,848,702 A | | 11/1974 | Bergman ...................... | 184/6.3 |
| 4,178,135 A | * | 12/1979 | Roberts ........................ | 417/222 |
| 4,553,857 A | * | 11/1985 | Ney ............................. | 384/398 |
| 5,209,650 A | * | 5/1993 | Lemieux ...................... | 384/115 |
| 5,415,476 A | * | 5/1995 | Onishi ......................... | 384/115 |
| 5,593,297 A | * | 1/1997 | Nakajima et al. .......... | 184/6.16 |
| 5,700,092 A | * | 12/1997 | Wasson et al. .............. | 384/115 |
| 5,795,140 A | | 8/1998 | Jin .............................. | 417/372 |

* cited by examiner

*Primary Examiner*—Chong H. Kim
(74) *Attorney, Agent, or Firm*—Finnegan, Henderson, Farabow, Garrett & Dunner, LLP

(57) ABSTRACT

A viscous pumping system for lubricating a bearing, including a reservoir configured to store a lubricant, a housing connected to the reservoir and mounting the bearing, and a shaft disposed in the housing and supported by the bearing. The shaft is rotatable in a forward direction and a reverse direction and has a first helical groove and a second helical groove. The first helical groove and the second helical groove are configured so that they act to pump sufficient lubricant from a groove origin to the bearing when said shaft rotates in both the forward direction and the reverse direction. It is contemplated that the viscous pumping system may be used to lubricate the bearing of a variable capacity compressor.

27 Claims, 8 Drawing Sheets

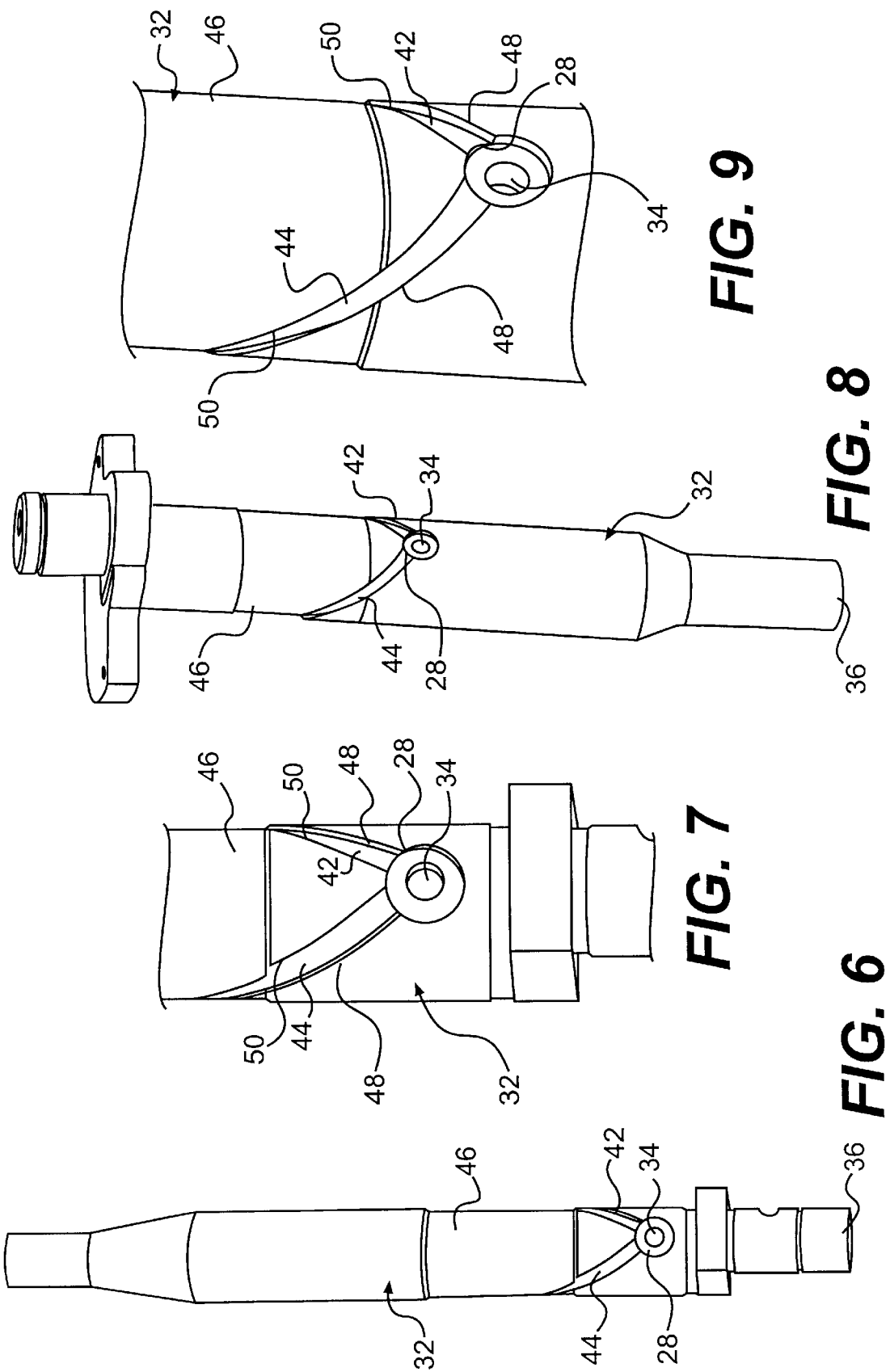

VISCOUS PUMPING SYSTEM

BACKGROUND OF THE INVENTION

The present invention generally relates to lubrication systems. More particularly, the present invention relates to a viscous pumping system for lubricating a bearing that supports a shaft.

Lubrication systems are used in a variety of applications to lubricate bearings. Many machines, such as mills, pumps, and engines, include bearings that require lubrication to function properly. If the bearings supporting a machine are not lubricated properly, continued operation of the machine may cause the bearings to seize, thereby damaging the machine.

One example of a machine requiring a lubrication system is a variable capacity compressor. This type of compressor is used when it is desirable to vary the compressor output, such as in refrigeration, air conditioning, and heat pump systems, among others. Modulation between two stages allows large gains in efficiency while normally providing reduced sound, improved reliability, and improved creature comforts, including better de-humidification and warmer air in heat pump mode.

The efficiency gains resulting from a compressor with capacity modulation are beneficial in a variety of commercial applications. For example, most residential refrigerators currently utilize a single capacity compressor and cycle the compressor on and off to maintain a certain temperature within the cabinet of the refrigerator. During normal operation, the temperature in the cabinet of the refrigerator increases due to the warmer ambient air surrounding the refrigerator. The cabinet temperature also rises when the refrigerator door is opened or a load of perishables having a temperature greater than that of the cabinet is introduced to the refrigerator. If the temperature exceeds a preset limit, the compressor is activated to cool the cabinet of the refrigerator. To account for the higher load conditions when the door is opened or perishables are introduced, the cooling capacity of the compressor is necessarily greater than the minimum required to maintain a particular temperature in the ambient conditions. With this design, the compressor undergoes multiple starts and stops to respond to varying load conditions. The high number of starts and stops will shorten the life of the compressor. Additionally, operating the compressor at full capacity during periods of minimal load is inefficient.

In a reciprocating piston type of variable capacity compressor, the stroke length of one or more of the reciprocating pistons is varied to change the volumetric capacity of the cylinder. The piston attains a full stroke length when the bearing-supported shaft rotates in the forward direction and attains a reduced stroke length when the shaft rotates in the reverse direction. Such an approach requires a motor or other drive system with a reversible shaft, i.e., one capable of rotating in a forward and a reverse direction.

Most lubrication systems for compressors are designed to lubricate a shaft that rotates in one direction only. A common lubrication system consists of a single helical groove that traverses the shaft to pump a lubricant from a reservoir in the compressor housing to the upper portion of the bearing when the shaft rotates in one direction. If the rotation of the shaft were reversed, however, these lubrication systems would draw lubricant out of the bearing, potentially causing the bearing to seize and/or damaging the compressor.

Lubrication systems that are known to the inventor and are designed to provide lubrication for both directions of shaft rotation also do not offer complete protection against seizure. Such a system typically consists of opposing helical grooves traversing the shaft. Lubricant is provided to the grooves in various manners. When the shaft rotates in the forward direction, the trailing edge of the first helical groove has a positive effect as it pumps lubricant to the bearing, but the trailing edge of the second, opposing helical groove has a negative effect as it simultaneously pumps lubricant out of the bearing. When the shaft rotates in the reverse direction, the trailing edge of the second helical groove has a positive effect as it pumps lubricant to the bearing, but the trailing edge of the first, opposing helical groove has a negative effect as it simultaneously pumps lubricant out of the bearing. Because the system pumps lubricant out of the bearing at the same time it is pumping lubricant to the bearing, the system is inefficient and results in increased wear on the compressor components, increased warranty costs for the components, and potential bearing seizure and compressor damage.

In light of the foregoing, there is a need for a system that efficiently lubricates the bearing of a reversible shaft irrespective of the direction of rotation of the shaft.

SUMMARY OF THE INVENTION

Accordingly, the present invention is directed to a viscous pumping system for lubricating a bearing that supports a reversible shaft. The pumping system provides lubrication to the bearing irrespective of the direction of rotation of the shaft. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

In accordance with achieving the objects and the purpose of the invention, as embodied and broadly described herein, the invention is directed to a viscous pumping system for lubricating a bearing. The system comprises a reservoir configured to store a lubricant, a housing connected to the reservoir and mounting the bearing, and a shaft disposed in the housing and supported by the bearing. The shaft is rotatable in both a forward and a reverse direction. The shaft has at least two helical grooves that are configured to sufficiently lubricate the bearing irrespective of whether the shaft rotates in the forward direction or the reverse direction.

In another aspect, the invention is directed to a viscous pumping system for lubricating a bearing via specifically configured helical groove edges. The system comprises a reservoir designed to store a lubricant, a housing connected to the reservoir and mounting the bearing, and a shaft disposed in the housing and supported by the bearing. The shaft is rotatable in both a forward and a reverse direction and has two helical grooves. The first helical groove has a first edge configured to pump lubricant contained in the reservoir to the bearing when the shaft rotates in the forward direction and a second edge configured to substantially avoid pumping lubricant away from the bearing when the shaft rotates in the reverse direction. The second helical groove has a second edge configured to substantially avoid pumping lubricant away from the bearing when the shaft rotates in the forward direction and a first edge configured to pump lubricant contained in the reservoir to the bearing when the shaft rotates in the reverse direction.

In another aspect, the invention is directed to a viscous pumping system for lubricating a bearing via a groove structure in combination with a lubricant pickup system. The system comprises a reservoir designed to store a lubricant, a housing connected to the reservoir and mounting the bearing, and a shaft disposed in the housing and supported by the bearing. The shaft is rotatable in a forward direction and a reverse direction and has a first helical groove and a second helical groove emanating from a groove origin. Additionally, the system includes a lubricant pickup system disposed within the shaft and configured to transport the lubricant from a lubricant entrance located at the reservoir, up the shaft, and out of a lubricant exit located at the groove origin. In combination, the pickup system, the first helical groove, and the second helical groove are configured to sufficiently lubricate the bearing when the shaft rotates in both the forward direction and the reverse direction.

In yet another aspect, the invention is directed to a variable capacity compressor. This compressor comprises a block that defines a lubricant reservoir and a cylinder having an associated compression chamber and an associated piston. The compressor further comprises a bearing disposed in the block and a shaft that is supported by the bearing and rotatable in both the forward and the reverse direction. The shaft is connected to the piston to provide a first stroke length when the shaft rotates in the forward direction and a second stroke length when the shaft rotates in the reverse direction. The first stroke length differs from the second stroke length. The shaft may have two helical grooves configured to pump lubricant contained in the reservoir from the groove origin to the bearing when the shaft rotates in the forward direction and when it rotates in the reverse direction. In one aspect of the compressor system, the edges of the helical grooves are configured to pump sufficient lubricant from a groove origin to the bearing irrespective of the direction of rotation of the shaft. In another aspect of the compressor system, the combination of a lubricant pickup system and configured helical groove edges is operable to sufficiently lubricate the bearing irrespective of the direction of rotation of the shaft.

In each aspect of the invention, the configuration of the groove edges is either entirely or partially responsible for the pumping effect regardless of the direction of rotation of the shaft. In a certain embodiment, if the shaft rotates in a forward direction, for example, one of the two grooves, the "active" groove for the forward rotation, will pump lubricant to the bearing. Meanwhile, the second, "passive" groove for the forward direction substantially avoids pumping lubricant away from the bearing. When the direction of rotation of the shaft is reversed, what was the active groove in the forward direction becomes the passive groove in the reverse direction, and the formerly passive groove becomes active. In certain other embodiments, the grooves are not "active" and "passive." Rather, due to the configuration of the lubricant pickup system, in a particular direction of rotation of the shaft, one of the two grooves, the "positive" groove, pumps lubricant to the bearing. The other, "negative" groove pumps a minimal amount of lubricant out of the bearing in comparison to the amount of lubricant pumped to the bearing by the combination of the lubricant pickup system and the "positive" groove. In the opposite direction of rotation of the shaft, the roles of the grooves reverse so that the formerly "negative" groove pumps lubricant to the bearing and the formerly "positive" groove pumps a relatively minimal amount of lubricant out of the bearing.

In all embodiments of the invention, the net result is that the bearing is sufficiently lubricated regardless of the direction of rotation of the shaft. In one embodiment, the tapered grooves alone are responsible; in another embodiment, the grooves in combination with a specially configured lubricant pickup system are responsible. One such lubricant pickup system is configured so that centrifugal forces suction lubricant out of the reservoir, up the shaft, into the lubricant pickup exit and out of the groove origin.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 6 is a perspective view of a shaft in accordance with the present invention.

FIG. 7 is a detailed perspective view of helical grooves on a shaft in accordance with the present invention.

FIG. 8 is a perspective view of another embodiment of a shaft in accordance with the present invention.

FIG. 9 is a detailed perspective view of another embodiment of helical grooves on a shaft in accordance with the present invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, a viscous pumping system is provided for lubricating a bearing supporting a reversible shaft. In one contemplated embodiment, the bearing and shaft are disposed in a variable capacity compressor. Exemplary variable capacity compressors are described in U.S. Pat. Nos. 4,236,874, 4,248,053, 4,479,419, and 4,494,447, the disclosures of which are hereby incorporated by reference in their entirety. The present invention contemplates that the ideas and concepts disclosed herein may similarly be used in other machines utilizing a viscous pumping system for lubrication.

Figure 1:
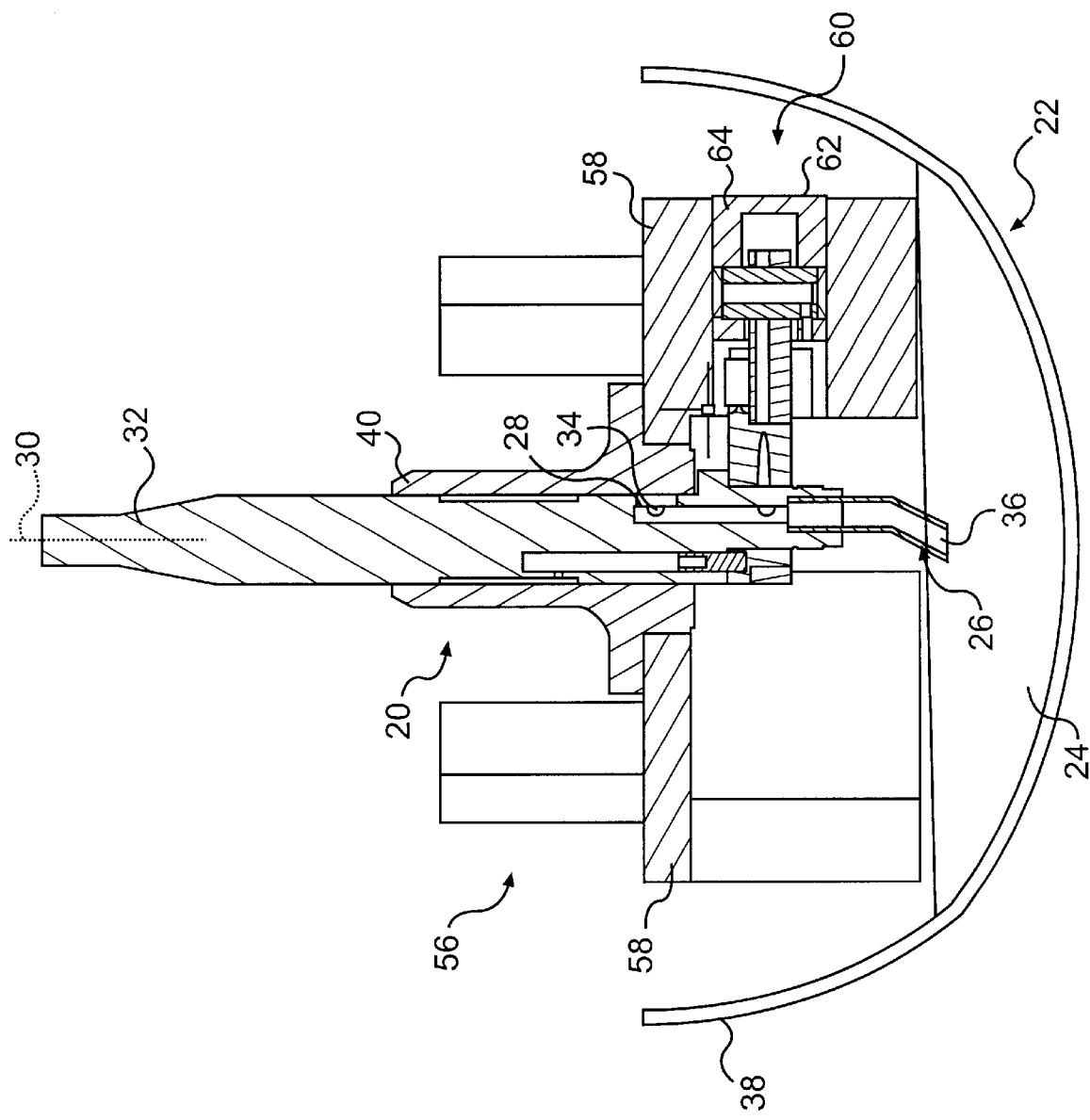
FIG. 1 is a cross-sectional view of a variable capacity compressor including a viscous pumping system in accordance with the present invention.

An exemplary embodiment of a variable capacity compressor including a viscous pumping system according to the present invention is illustrated in FIG. 1 and is designated generally as reference number 56.

Figure 2:
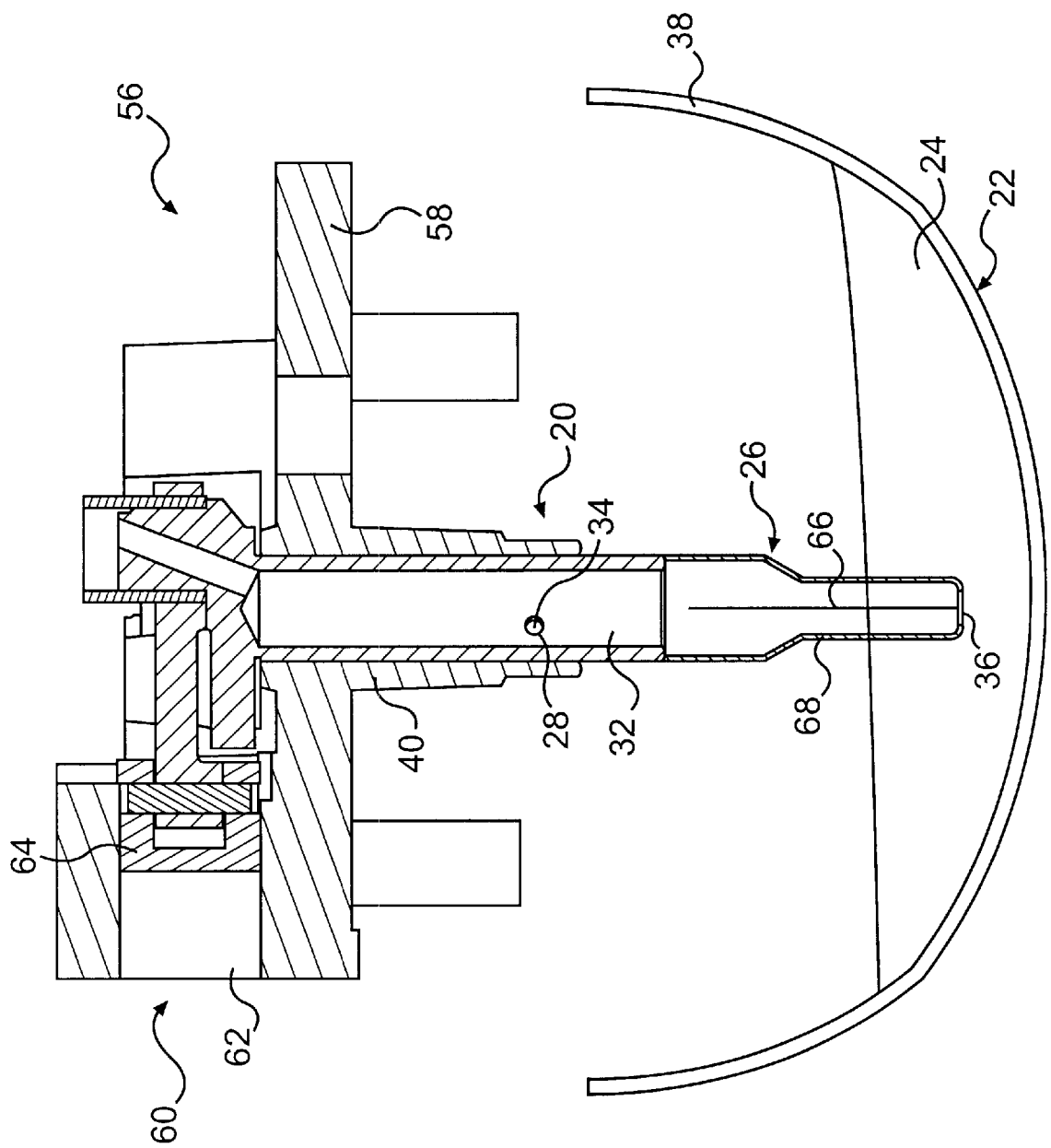
FIG. 2 is a cross-sectional view of a variable capacity compressor illustrating another embodiment of a viscous pumping system in accordance with the present invention.

FIGS. 1 and 2 illustrate two different compressors. In both figures, compressor 56 has a block 58 that mounts a bearing 40 and defines a cylinder 60 having a compression chamber 62 in which piston 64 is slidably disposed. Compressor 56 also has a housing 38 that defines a reservoir 22. Reservoir 22 is configured to store a supply of lubricant 24.

In the illustrated embodiment, reservoir 22 is internal to the compressor 56, although it is contemplated that the reservoir may be external to the compressor. Preferably, lubricant 24 is oil; however, other known lubricants may be used.

In FIGS. 1 and 2, compressor 56 contains a viscous pumping system 20, including reservoir 22 containing lubricant 24, a lubricant pickup system 26, a groove origin 28, and a shaft 32 having specially configured grooves subsequently described with respect to FIGS. 4–13. Shaft 32 is contained in block 58 and is supported by bearing 40. Although shaft 32 is shown disposed vertically in the compressors 56 of FIGS. 1 and 2, in some embodiments it also may be positioned angled to some degree. Preferably, shaft 32 is rotatable in a forward and a reverse direction, although aspects of the viscous pumping system 20 of the present invention will work for a shaft rotatable in only one direction.

Compressor 56 operates at one stroke length when shaft 32 operates in the forward direction and another stroke length in the reverse direction. More particularly, shaft 32 is connected to piston 64 to provide a first stroke length within cylinder 60 when shaft 32 rotates in a forward direction and a second stroke length when shaft 32 rotates in a reverse direction. The first stroke length differs from the second stroke length. Thus, the capacity of the compressor may be varied by reversing the direction of shaft rotation. It is contemplated that, for application in the refrigeration industry, compressor 56 operates at a full stroke length in the forward direction and a half stroke length in the reverse direction of rotation of shaft 32.

In accordance with the present invention, the shaft is supported by a bearing and is capable of rotating in a forward direction and a reverse direction. The shaft has two helical grooves that traverse the shaft and are configured so that a sufficient amount of lubricant contained in a reservoir is pumped to a bearing irrespective of whether the shaft rotates in the forward direction or the reverse direction. The two helical grooves each have edges configured to pump lubricant contained in the reservoir to the bearing in one direction of rotation of the shaft. Preferably, the edges of the grooves are configured so that in each direction of rotation, one of the two helical grooves, the "active" or "positive" groove for that particular direction of rotation, pumps lubricant contained in the reservoir to the bearing, while the other "passive" or "negative" groove either substantially avoids pumping lubricant away from the bearing or pumps only a minimal amount of lubricant away from the bearing relative to the amount pumped to the bearing. By pumping considerably more lubricant to the bearing than it draws out in both a forward and a reverse direction of rotation, such a system ensures that the bearing is adequately lubricated regardless of the direction of rotation of the shaft.

As illustrated in FIG. 6, a first helical groove 42 and a second helical groove 44 traverse a surface 46 of shaft 32. In the embodiment shown in FIGS. 6 and 7, helical grooves 42 and 44 originate in the same groove origin 28 and symmetrically traverse the length of shaft 32 in opposing directions. This configuration simplifies the design and provides lubricant to both groves at the same pressure and/or flow rate. It is contemplated, however, that helical grooves 42 and 44 can emanate from two different groove origins 28. Although in FIGS. 4 and 6 grooves 42 and 44 traverse shaft 32 from groove origin 28 to the top of bearing 40, the location of bearing 40 may vary and grooves 42 and 44 may be of any length capable of providing lubrication along the length of a surface 46 of shaft 32 in communication with bearing 40, as illustrated by comparison of FIGS. 5 and 8.

Figure 5:
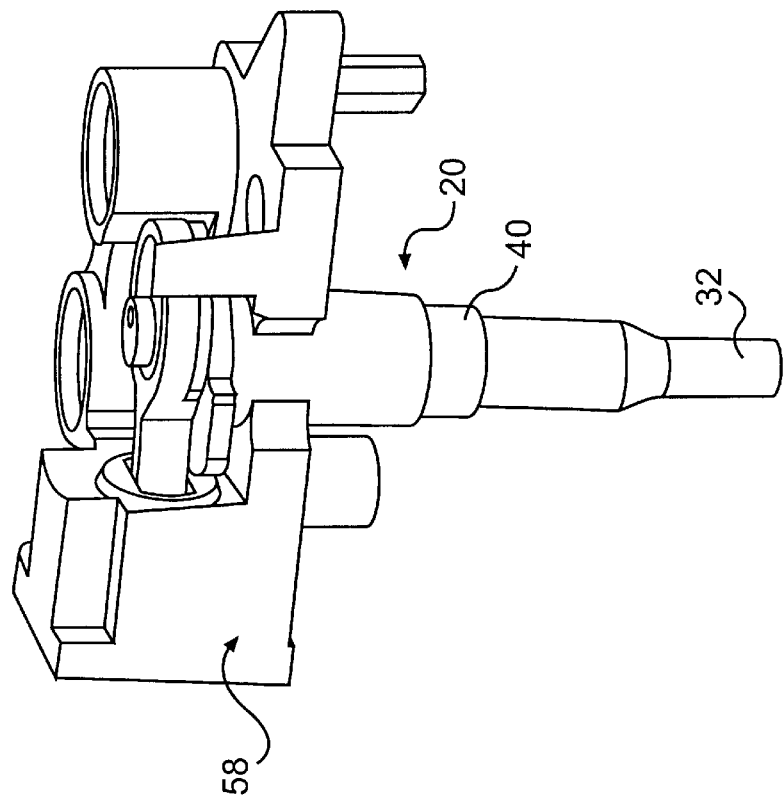
FIG. 5 is a perspective view of another embodiment of a viscous pumping system for a reversible shaft in accordance with the present invention.
Figure 4:
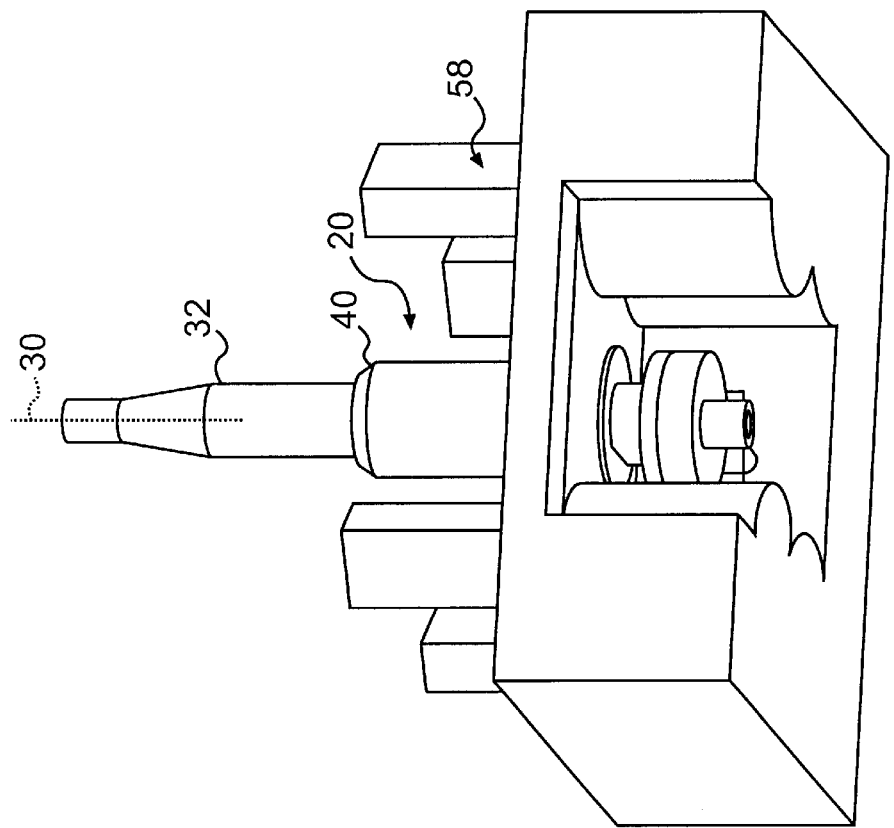
FIG. 4 is a perspective view of a viscous pumping system for a reversible shaft in accordance with the present invention.

The shafts 32 shown in detail in FIGS. 6–9 are depicted as part of viscous pumping system 20 in FIGS. 4 and 5. FIG. 4 illustrates shaft 32 rotating about its axis 30 and disposed within bearing 40. As discussed above with respect to FIGS. 1, 6, and 7 and FIGS. 2, 8 and 9, groove origin 28 preferably is located at or proximate to the point where shaft 32 begins to communicate with bearing 40. Helical grooves 42 and 44 pump lubricant 24 from one end to the other end of bearing 40 along surface 46 of shaft 32. Helical grooves 42 and 44 occupy a length of shaft 32 in communication with bearing 40 and provide lubrication to bearing 40. When shaft 32 rotates in the forward direction, as depicted by the arrow in FIGS. 10 and 12, groove 42 is the "active" or "positive" groove that pumps lubricant 24 to bearing 40, while groove 44 is the "active" or "positive" groove when shaft 32 rotates in the reverse direction.

FIG. 5, meanwhile, illustrates another contemplated configuration wherein shaft 32 disposed within bearing 40 is disposed 180° with respect to shaft 32 of FIG. 4. The location of bearing 40 surrounding shaft 32 in FIG. 5 necessitates that the location of viscous pumping system 20 along shaft 32 differs from that in FIGS. 4, 6 and 7. In this configuration, groove origin 28 in the viscous pumping system illustrated in FIGS. 5, 8 and 9 is located mid-way along shaft 32. As in FIG. 4, helical grooves 42 and 44 occupy that length of shaft 32 in communication with bearing 40 to provide lubrication.

The structure of first and second helical grooves 42 and 44 affects the lubrication of the bearing 40. First helical groove 42 and second helical groove 44 each have a first edge 48 and a second edge 50, as shown in FIGS. 7 and 9.

Figure 11:
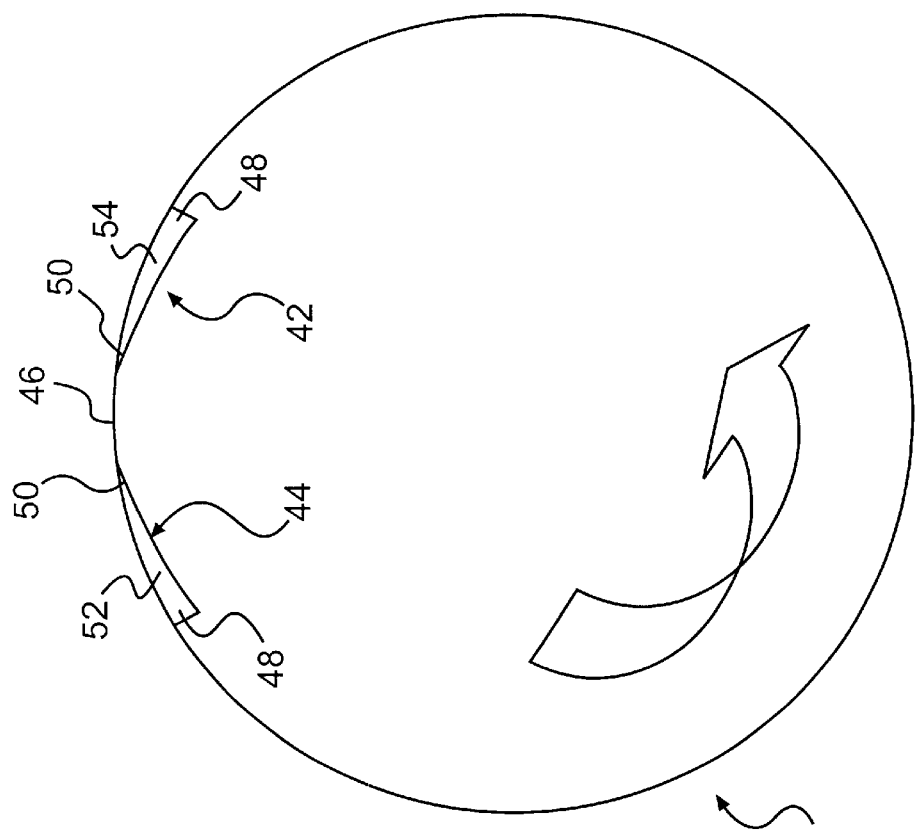
FIG. 11 is a section through the piece of the shaft of FIG. 10.
Figure 10:
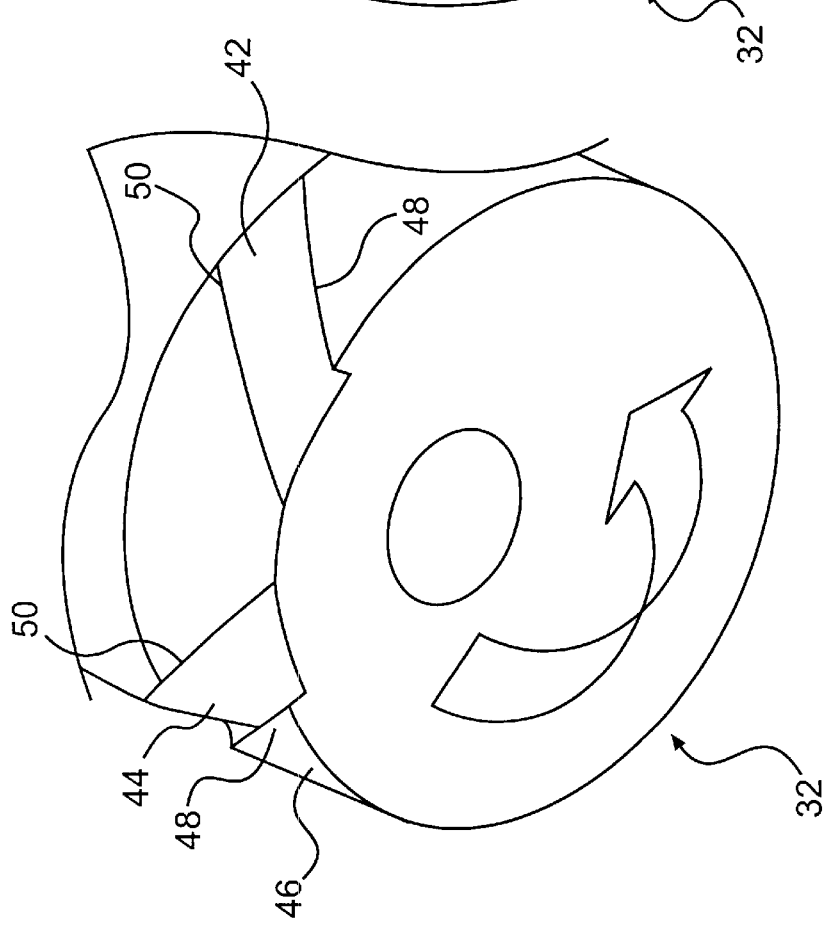
FIG. 10 is a perspective view of a portion of a shaft illustrating a preferred embodiment of the helical grooves in accordance with the present invention.

In the embodiment shown in FIG. 10 and FIG. 11, first edge 48 of first helical groove 42 and first edge 48 of second helical groove 44 are substantially perpendicular to the surface 46 of shaft 32. This sharp angle of first edge 48 of grooves 42 and 44 ensures that the sharp angled edge, when serving as the trailing edge of the active groove in a particular direction of rotation, pumps lubricant 24 along shaft 32 in communication with bearing 40. Meanwhile, second edge 50 of first helical groove 42 and second edge 50 of second helical groove 44 each taper into surface 46 of shaft 32. This tapering of second edge 50 of grooves 42 and 44, when edge 50 serves as a trailing edge, prevents or significantly minimizes the trailing edge of the passive groove in a particular direction of rotation from pumping lubricant 24 away from bearing 40. Preferably, second edge 50 is totally passive and avoids drawing any lubricant 24 away from bearing 40.

The sharp angling and tapering of edges 48 and 50 shown in FIGS. 10 and 11 is representational only, and edges 48 that are more or less than 90° and tapering edges 50 that taper to a greater or lesser degree than those illustrated in FIGS. 10 and 11 can be applied to the invention. Acceptable angles and designs for a given application can be determined through analytical analyses or empirical testing, or a combination of both. First helical groove 42 may or may not be a reflection, or mirror-image, of second helical groove 44.

Without restricting the invention or its application, some examples and/or exemplary information is provided below. Shaft 32 has a diameter of approximately 0.625" when used in a refrigeration compressor of approximately 800 Btu/Hour capacity at a condition of −10/105° F. In this application, the invention provides a lubricant circulation capacity of between 1 oz. per 60 seconds and 1 oz. per 20 seconds, depending on the viscosity of the oil and the rotation speed of the shaft 32. The ranges are illustrative only, and are not restrictive of the invention as claimed. It is contemplated that the ranges may increase or decrease depending on several factors, including but not limited to the shaft diameter, the bearing length, the shaft speed, the lubricant viscosity, the compressor capacity, and the values of the other dimensions. It is also contemplated that the system may be adapted for compressors ranging in capacity from 100 Btu/Hour to 500,000 Btu/Hour.

As shown in FIG. 11, first edge 48 of each helical groove 42, 44 provides a surface that will catch lubricant 24 and pump it upward through its helical, upward spiral. Second edge 50 of each helical groove 42, 44, on the other hand, is largely, if not totally, inactive. The depth of each helical groove 42, 44 may range from approximately 1.8% to 8% of the shaft diameter. The pitch of each helical groove 42, 44 may range from approximately 1" per revolution to 5" per revolution. Again, these values may change depending on the aforementioned factors, and in no way restricts the invention or its application.

Figure 13:
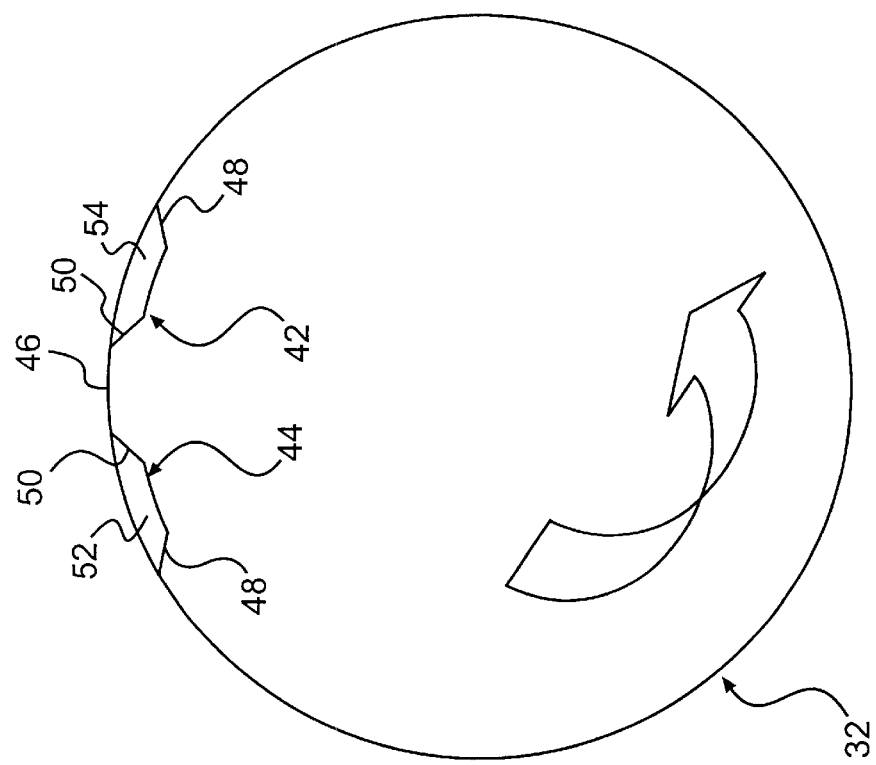
FIG. 13 is a section through the piece of the shaft of FIG. 12.
Figure 12:
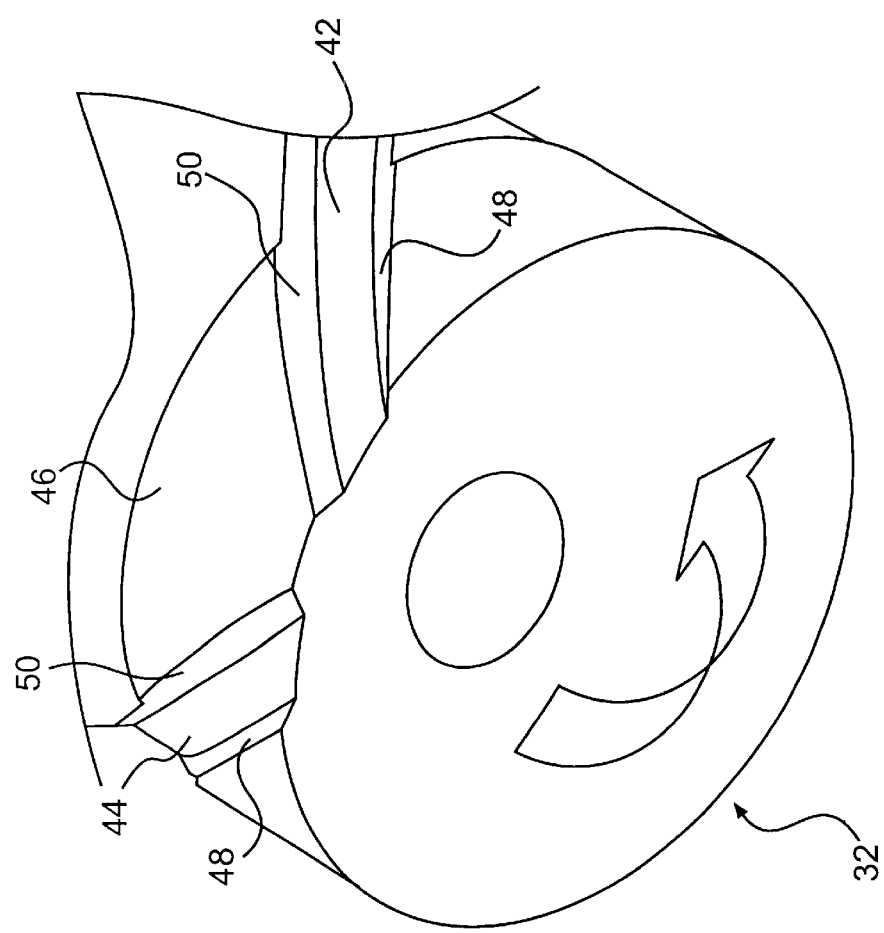
FIG. 12 is a perspective view of a portion of a shaft illustrating another preferred embodiment of the helical grooves in accordance with the present invention.

In the embodiment illustrated in FIG. 12 and FIG. 13, first helical groove 42 and second helical groove 44 also each have first edge 48 and second edge 50. First groove 42 and second groove 44 each have a substantially symmetrical cross-sectional shape 52 and 54, respectively. Additionally, cross-sectional shape 52 of first groove 42 is substantially symmetrical to cross-sectional shape 54 of second groove 44. The symmetrical helical grooves 42, 44 formed by a first edge 48 and a second edge 50, in combination with lubricant pickup system 26, described below, serve to sufficiently lubricate bearing 40 regardless of the direction of rotation of shaft 32 for a range of dimensions.

As illustrated in viscous pumping system 20 of FIG. 1 and viscous pumping system 20 of FIG. 2, lubricant pickup system 26 extends from reservoir 22 to groove origin 28. Both of these lubricant pickup systems 26 depicted in FIGS. 1 and 2 suction lubricant 24 into lubricant pickup entrance 36 and force lubricant 24 out of lubricant pickup exit 34 by operation of centrifugal force.

Figure 3:
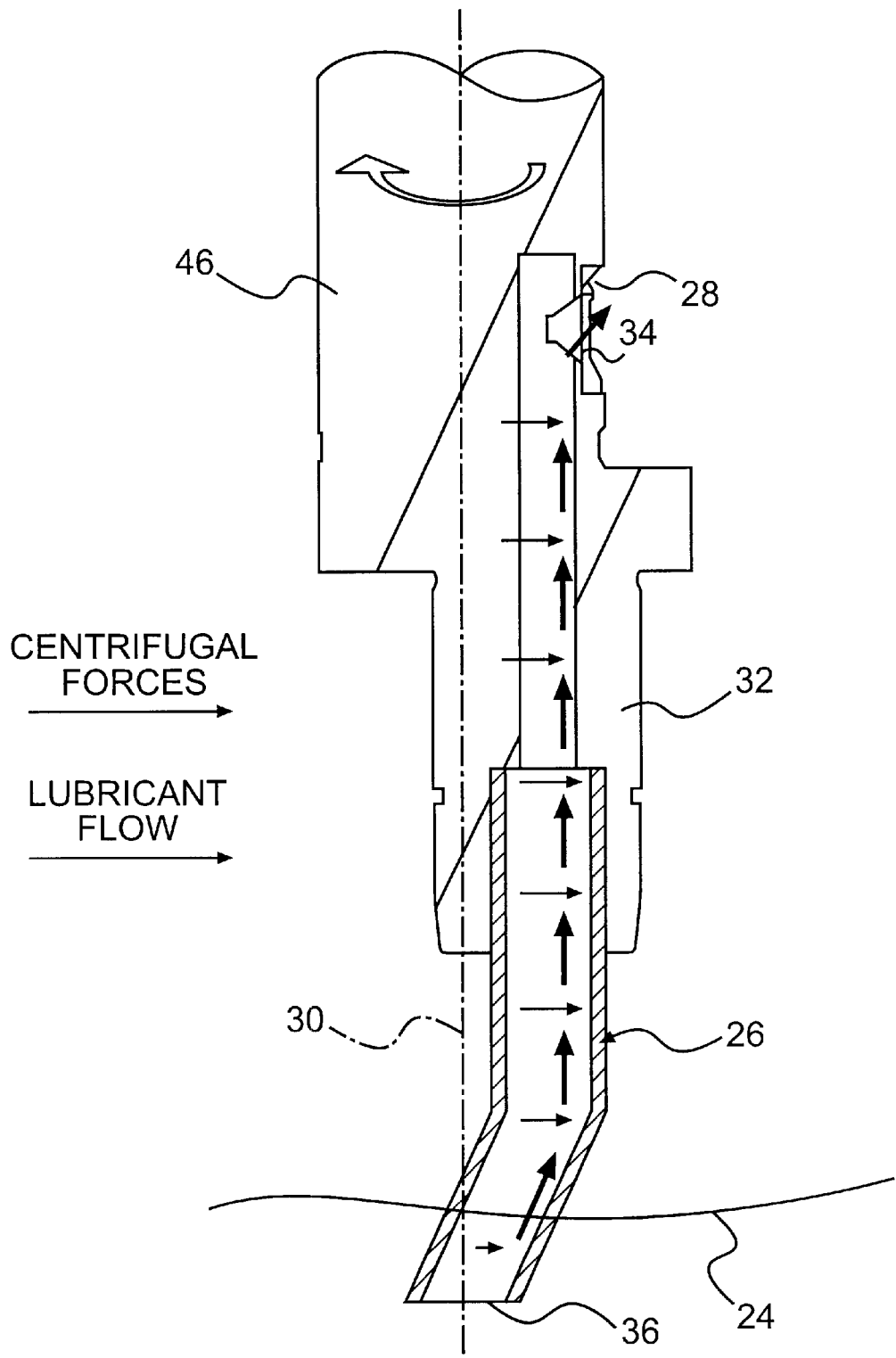
FIG. 3 is a cross-sectional. view of a lubricant pickup system illustrating a portion of the viscous pumping system in accordance with an embodiment of the present invention.

Lubricant pickup system 26, shown in FIG. 1 and illustrated in more detail in FIG. 3, works in combination with helical grooves 42, 44 in one embodiment of the present invention. In this particular embodiment of the viscous pumping system, the distance between a lubricant exit 34 (also serving as groove origin 28) and the axis of rotation 30 of shaft 32 is greater than the distance between a lubricant entrance 36 and the axis of rotation 30 of shaft 32. Thus, when shaft 32 rotates, lubricant pickup exit 34 rotates faster than lubricant pickup entrance 36 at reservoir 22, and the resulting centrifugal force (represented by arrows in FIG. 3) creates a suction that pulls lubricant 24 (flow represented by bold arrows in FIG. 3) up to lubricant exit 34 from reservoir 22 and forces lubricant out of groove origin 28.

In FIG. 2, another lubricant pickup system 26 is illustrated that operates under the sarme basic principle. In this particular embodiment, a baffle 66 is connected to the shaft 32 and is disposed in a cone 68. When shaft 32 rotates, lubricant 24 is drawn into lubricant pickup entrance 36, baffle 66 throws lubricant against the inner wall of cone 68, and centrifugal force causes lubricant 24 to travel up the inner wall of cone 68 and out of lubricant pickup exit 34. It is contemplated that baffle 66 may be a flat metal plate that operates like a paddle. In addition to the aforementioned embodiments, other acceptable designs for the lubricant pumping system 26 that pump lubricant 24 from reservoir 22 to groove origin 28 can be determined for a given application through analytical analyses and empirical testing.

In a first operational embodiment of the present invention, consider shaft 32 of FIGS. 10 and 11 rotating in the forward direction, as indicated by the counter-clockwise arrow. Previously described pickup system 26, such as that shown in FIGS. 1, 2 and 3, is preferably applied to this embodiment but is not required because specially configured helical grooves 42, 44 will lubricate bearing 40 regardless of the direction of rotation of shaft 32 and regardless of the type of pickup system 26. When shaft 32 rotates in the forward direction, lubricant 24 enters helical groove 42 at groove origin 28. Trailing edge 48 of first helical groove 42 pumps lubricant 24 from groove origin 28 up surface 46 of shaft 32 in communication with bearing 40 because trailing edge 48 is substantially perpendicular to axis of rotation 30 of shaft 32. Because trailing edge 50 of second helical groove 44 is tapered into surface 46 of shaft 32, trailing edge 50 substantially avoids pumping lubricant 24 down shaft 32 away from bearing 40. Rather, trailing edge 50 of helical groove 44 preferably remains totally passive.

Similarly, when shaft 32 of FIGS. 10 and 11 rotates in the reverse direction, opposite to the direction of the counter-clockwise arrow, lubricant 24 is pumped into, but preferably not out of, bearing 40. When shaft 32 rotates in the reverse direction, lubricant 24 again enters helical groove 44 at groove origin 28. Trailing edge 48 of second helical groove 44 pumps lubricant from groove origin 28 up surface 46 of shaft 32 in communication with bearing 40 because it is substantially perpendicular to axis of rotation 30 of shaft 32. Because trailing edge 50 of first helical groove 42 is tapered into surface 46 of shaft 32, trailing edge 50 substantially avoids pumping lubricant 24 down shaft 32 away from bearing 40, but preferably remains totally passive. Again, lubricant pickup system 26 is preferred but not necessary for this embodiment.

Another operational embodiment operates by the combined effect of lubricant pickup system 26 and helical grooves 42 and 44. Consider shaft 32 of FIGS. 12 and 13 rotating in the forward direction, as indicated by the counter-clockwise arrow. Lubricant pickup system 26, embodiments of which are illustrated in FIGS. 1 and 2 and the operation of which previously was described, draws lubricant 24 from reservoir 22 into lubricant pickup entrance 36, up shaft 32, and out lubricant pickup exit 34 and into groove origin 28. When shaft 32 rotates in the forward direction, lubricant 24 enters helical groove 42 at groove origin 28. Trailing edge 48 of first helical groove 42 pumps lubricant 24 from groove origin 28 up surface 46 of shaft 32 to bearing 40. Lubricant pickup system 26, in combination with the configuration of first and second edges 48, 50 of helical grooves 42, 44, increases the amount of lubricant pumped to bearing 40. At the same time, trailing edge 50 of second groove 44 would pump some lubricant 24 downward out of bearing 40 during forward rotation of shaft 32. The amount of lubricant 24 pushed upward by the combined effect of the lubricant pickup system 26 and the leading edge 48 is greater than the amount of lubricant 24 pushed downward by trailing edge 50.

Figure 14:
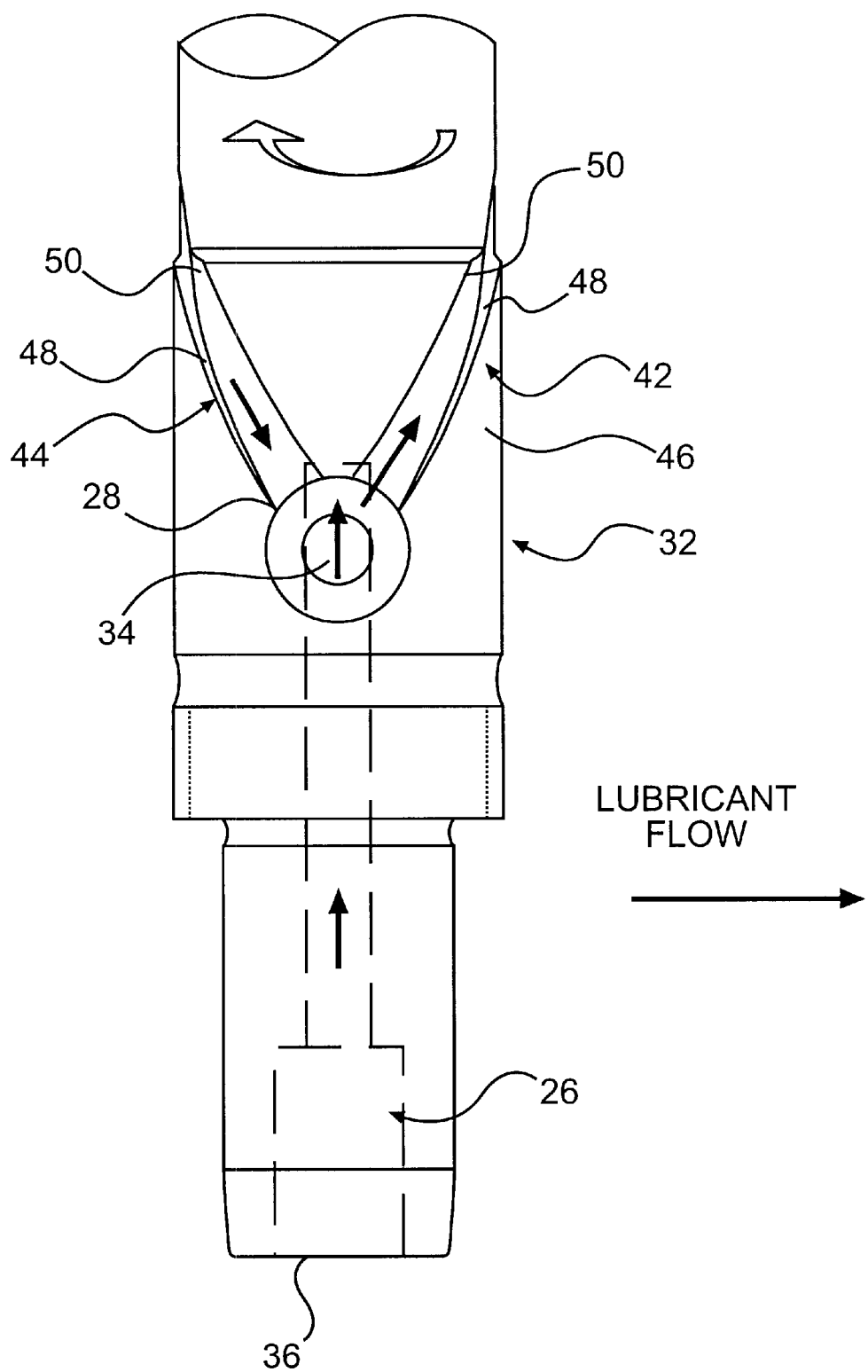
FIG. 14 is a side view of a working portion of the shaft of FIG. 1 illustrating the flow of lubricant in the lubricant pickup system and the helical grooves.

The pumping effect for a preferred embodiment is illustrated in FIG. 14. Shaft 32 rotates in the forward direction, as indicated by the curved arrow. Lubricant 24 is drawn out of the groove origin 28 by centrifugal forces and trailing edge 48 of helical groove 42 pumps lubricant up bearing 40, where the flow of lubricant 24, indicated by the solid arrows, is increased with this combination. Meanwhile, although trailing edge 50 of helical groove 44 pumps lubricant 24 away from bearing 40, as indicated by the short arrow, the net effect of the combination of symmetrical helical grooves 42, 44 and specially configured lubricant pickup 26 is that bearing 40 in communication with shaft 32 is sufficiently lubricated. This result is achieved because lubricant 24 pumped to bearing 40 by the combination of lubricant pickup system 26 and the positive helical groove 42 exceeds lubricant 24 drawn out of bearing 40 by the negative helical groove 44.

Similarly, when shaft 32 of FIGS. 12 and 13 rotates in the reverse direction, opposite to the direction of the counter-clockwise arrow in FIGS. 12 and 13, more lubricant 24 is pumped into, rather than out of, bearing 40 by the combination of lubricant pickup system 26 and the positive helical groove 44 exceeds lubricant 24 drawn out of bearing 40 by the negative helical groove 42.

It will be apparent to those skilled in the art that various modifications and variations can be made in the system and construction of the present invention, a viscous pump system for lubricating machinery with a reversible shaft, without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A viscous pumping system for lubricating a bearing, comprising:
   a reservoir configured to store a lubricant;
   a housing connected to the reservoir and mounting the bearing; and
   a shaft disposed in the housing and supported by the bearing, said shaft rotatable in a forward direction and a reverse direction and having a first helical groove and a second helical groove, each of said first and second helical grooves having a first edge and a second edge, wherein at least one of said first and second edges of one of said first and second helical grooves is configured so that it acts to substantially avoid pumping lubricant away from the bearing when the shaft rotates in the forward direction and at least one of said first and second edges of the other of said first and second helical grooves is configured so that it acts to substantially avoid pumping lubricant away from the bearing when the shaft rotates in the reverse direction.

2. The system of claim 1, wherein a portion of said shaft is supported by the bearing and wherein said first and said second helical grooves are formed in said portion of said shaft supported by the bearing.

3. The system of claim 1, wherein said first helical groove and said second helical groove emanate from a common groove origin.

4. The system of claim 1, wherein said first helical groove and said second helical groove traverse the surface of said shaft in opposing directions.

5. The system of claim 1, wherein said first helical groove and said second helical groove symmetrically traverse, in opposing directions, a length of the surface of said shaft in communication with the bearing.

6. A viscous pumping system for lubricating a bearing, comprising:
   a reservoir configured to store a lubricant;
   a housing connected to the reservoir and mounting the bearing; and
   a shaft disposed in the housing and supported by the bearing, said shaft rotatable in a forward direction and a reverse direction and having a first helical groove and a second helical groove, wherein said first helical groove has a first edge configured to pump lubricant to the bearing when said shaft rotates in the forward direction and a second edge configured to substantially avoid pumping lubricant away from the bearing when said shaft rotates in the reverse direction, and said second helical groove has a second edge configured to substantially avoid pumping lubricant away from the bearing when said shaft rotates in the forward direction and a first edge configured to pump lubricant to the bearing when said shaft rotates in the reverse direction.

7. The system of claim 6, wherein a portion of said shaft is supported by the bearing and wherein said first and said second helical grooves are formed in said portion of said shaft supported by the bearing.

8. The system of claim 6, wherein said first helical groove and said second helical groove emanate from a common groove origin.

9. The system of claim 6, wherein said first helical groove and said second helical groove traverse the surface of said shaft in opposing directions.

10. The system of claim 6, wherein said first helical groove and said second helical groove symmetrically traverse, in opposing directions, a length of the surface of said shaft in communication with the bearing.

11. The system of claim 10, wherein said first edge of said first helical groove and said first edge of said second helical groove each are substantially perpendicular to a tangent to a surface of said shaft, and said second edge of said first helical groove and said second edge of said second helical groove each substantially taper into the surface of said shaft.

12. The system of claim 10, wherein said first helical groove is a reflection of said second helical groove.

13. The system of claim 10, wherein the depth of each groove ranges from approximately 1.8% to 8% of a diameter of said shaft.

14. The system of claim 10, wherein the pitch of said first and second helical grooves may range from approximately 1 inch per revolution to 5 inches per revolution.

15. The system of claim 1, further comprising: a pickup system disposed within said shaft and configured to transport the lubricant from a lubricant entrance located at the reservoir up said shaft and out of a lubricant exit adjacent to an origin of said first helical groove and an origin of said second helical groove, wherein said pickup system, said first helical groove, and said second helical groove cooperate to sufficiently lubricate the bearing when said shaft rotates in both the forward direction and the reverse direction.

16. The system of claim 15, wherein said lubricant pickup system includes a flow channel extending along a length of a portion of said shaft and including said lubricant exit at an end and said lubricant entrance at an opposite end, wherein a distance between an axis of rotation of said shaft and said lubricant exit is greater than a distance between said axis of rotation of said shaft and said lubricant entrance.

17. A variable capacity compressor system comprising:
- a block defining a lubricant reservoir and a cylinder having an associated compression chamber and an associated piston;
- a bearing disposed in the block;
- a shaft supported by the bearing and rotatable in a forward direction and in a reverse direction, said shaft connected to the piston such that when said shaft rotates in the forward direction, the piston has a first stroke length, and when said shaft rotates in the reverse direction, the piston has a second stroke length, the first stroke length differing from the second stroke length, and said shaft having a first helical groove and a second helical groove, each of said first and second helical grooves having a first edge and a second edge, wherein at least one of said first and second edges of one of said first and second helical grooves is configured so that it acts to substantially avoid pumping lubricant away from the bearing when the shaft rotates in the forward direction and at least one of said first and second edges of the other of said first and second helical grooves is configured so that it acts to substantially avoid pumping lubricant away from the bearing when the shaft rotates in the reverse direction.

18. The system of claim 17, wherein a portion of said shaft is supported by the bearing and wherein said first and said second helical grooves are formed in said portion of said shaft supported by the bearing.

19. The system of claim 17, wherein said first helical groove and said second helical groove traverse the surface of said shaft in opposing directions.

20. The system of claim 17, wherein said first helical groove and said second helical groove are symmetrical and traverse, in opposing directions, a length of the surface of said shaft in communication with the bearing.

21. A variable capacity compressor system comprising:
- a block defining a lubricant reservoir and a cylinder having an associated compression chamber and an associated piston;
- a bearing disposed in the block;
- a shaft supported by the bearing and rotatable in a forward direction and in a reverse direction, said shaft connected to the piston such that when said shaft rotates in the forward direction, the piston has a first stroke length, and when said shaft rotates in the reverse direction, the piston has a second stroke length, the first stroke length differing from the second stroke length, and said shaft having a first helical groove and a second helical groove, wherein said first helical groove has a first edge configured to pump lubricant to the bearing when said shaft rotates in the forward direction and a second edge configured to substantially avoid pumping lubricant away from the bearing when said shaft rotates in the reverse direction, and said second helical groove has a second edge configured to substantially avoid pumping lubricant away from the bearing when said shaft rotates in the forward direction and a first edge configured to pump lubricant to the bearing when said shaft rotates in the reverse direction.

22. The system of claim 21, wherein said first edge of said first helical groove and said first edge of said second helical groove each are substantially perpendicular to a tangent to a surface of said shaft, and said second edge of said first helical groove and said second edge of said second helical groove each substantially taper into the surface of said shaft.

23. The system of claim 22, wherein said first helical groove is a reflection of said second helical groove.

24. The system of claim 22, wherein the depth of each groove ranges from approximately 1.8% to 8% of a diameter of said shaft.

25. The system of claim 22, wherein the pitch of said first and second helical grooves may range from approximately 1 inch per revolution to 5 inches per revolution.

26. The system of claim 17, further comprising:
- a pickup system disposed within said shaft and configured to transport the lubricant from a lubricant entrance located at the reservoir up said shaft and out of a lubricant exit adjacent to an origin of said first helical groove and an origin of said second helical groove, wherein said pickup system, said first helical groove, and said second helical groove cooperate to sufficiently lubricate the bearing when said shaft rotates in both the forward direction and the reverse direction.

27. The system of claim 26, wherein said lubricant pickup system includes a flow channel extending along a length of a portion of said shaft and including said lubricant exit at an end and said lubricant entrance at an opposite end, and wherein a distance between an axis of rotation of said shaft and said lubricant exit is greater than a distance between said axis of rotation of said shaft and said lubricant entrance.

* * * * *